United States Patent
Horn et al.

(10) Patent No.: US 10,057,166 B2
(45) Date of Patent: Aug. 21, 2018

(54) NETWORK VERIFICATION

(71) Applicant: FUJITSU LIMITED, Kawasaki-shi, Kanagawa (JP)

(72) Inventors: Alexander Horn, Sunnyvale, CA (US); Mukul R. Prasad, San Jose, CA (US); Ali Kheradmand, Urbana, IL (US)

(73) Assignee: FUJITSU LIMITED, Kawasaki (JP)

( * ) Notice: Subject to any disclaimer, the term of this patent is extended or adjusted under 35 U.S.C. 154(b) by 73 days.

(21) Appl. No.: 15/264,501

(22) Filed: Sep. 13, 2016

(65) Prior Publication Data

US 2018/0077061 A1    Mar. 15, 2018

(51) Int. Cl.
*H04L 12/741* (2013.01)
*H04L 1/00* (2006.01)

(52) U.S. Cl.
CPC .......... *H04L 45/745* (2013.01); *H04L 1/0061* (2013.01)

(58) Field of Classification Search
CPC ............. H04L 41/0866; H04L 41/0869; H04L 41/0873; H04L 41/0893; H04L 1/0061; H04L 45/745
See application file for complete search history.

(56) References Cited

U.S. PATENT DOCUMENTS

| 9,225,601 | B2 | 12/2015 | Khurshid et al. |
| 2014/0369209 | A1* | 12/2014 | Khurshid ............ H04L 41/0866 370/250 |
| 2016/0112728 | A1* | 4/2016 | Kaushik ............. H04N 21/2385 725/116 |

OTHER PUBLICATIONS

Kazemian et al., "Real Time Network Policy Checking using Header Space Analysis," 10th USENIX Symposium on Networked Systems Design and Implementation, NSDI Apr. 2, 2013.
Yang and Lam, "Real-time verification of network properties using Atomic Predicates," Network Protocols (ICNP), 21st IEEE International Conference on Oct. 7, 2013.
Chen, Zhongbo, "Veriflow System Analysis and Optimization," University of Illinois at Urbana-Champaign, Sep. 16, 2014.

* cited by examiner

*Primary Examiner* — Ayaz Sheikh
*Assistant Examiner* — Debebe Asefa
(74) *Attorney, Agent, or Firm* — Maschoff Brennan

(57) ABSTRACT

A network verification method may include identifying a data plane including one or more forwarding tables for each switch of a plurality of switches in the data plane. The method may also include generating a forwarding behavior representation of the data plane to represent Boolean combinations of forwarding rules of the one or more forwarding tables of the data plane. Further, the method may include comparing the forwarding behavior representation of the data plane to one or more network properties to detect one or more errors in the data plane.

19 Claims, 17 Drawing Sheets

NETWORK VERIFICATION

FIELD

The embodiments discussed herein relate to network verification.

BACKGROUND

A software-defined network (SDN) may include a series of network objects (e.g., switches, routers, firewalls), which may be automated via commercial or open source tools customized according to one or more requirements (e.g., requirements of a network administrator). Network functions virtualization (NFV) includes moving network functions (e.g., functions performed by routers, firewall, load balancers), which are performed by dedicated hardware, into a virtualized environment.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a network verification method. The method may include identifying a data plane including one or more forwarding tables for each switch of a plurality of switches in the data plane. The method may also include generating a forwarding behavior representation of the data plane to represent Boolean combinations of forwarding rules of the one or more forwarding tables of the data plane. Further, the method may include comparing the forwarding behavior representation of the data plane to one or more network properties to detect one or more errors in the data plane.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
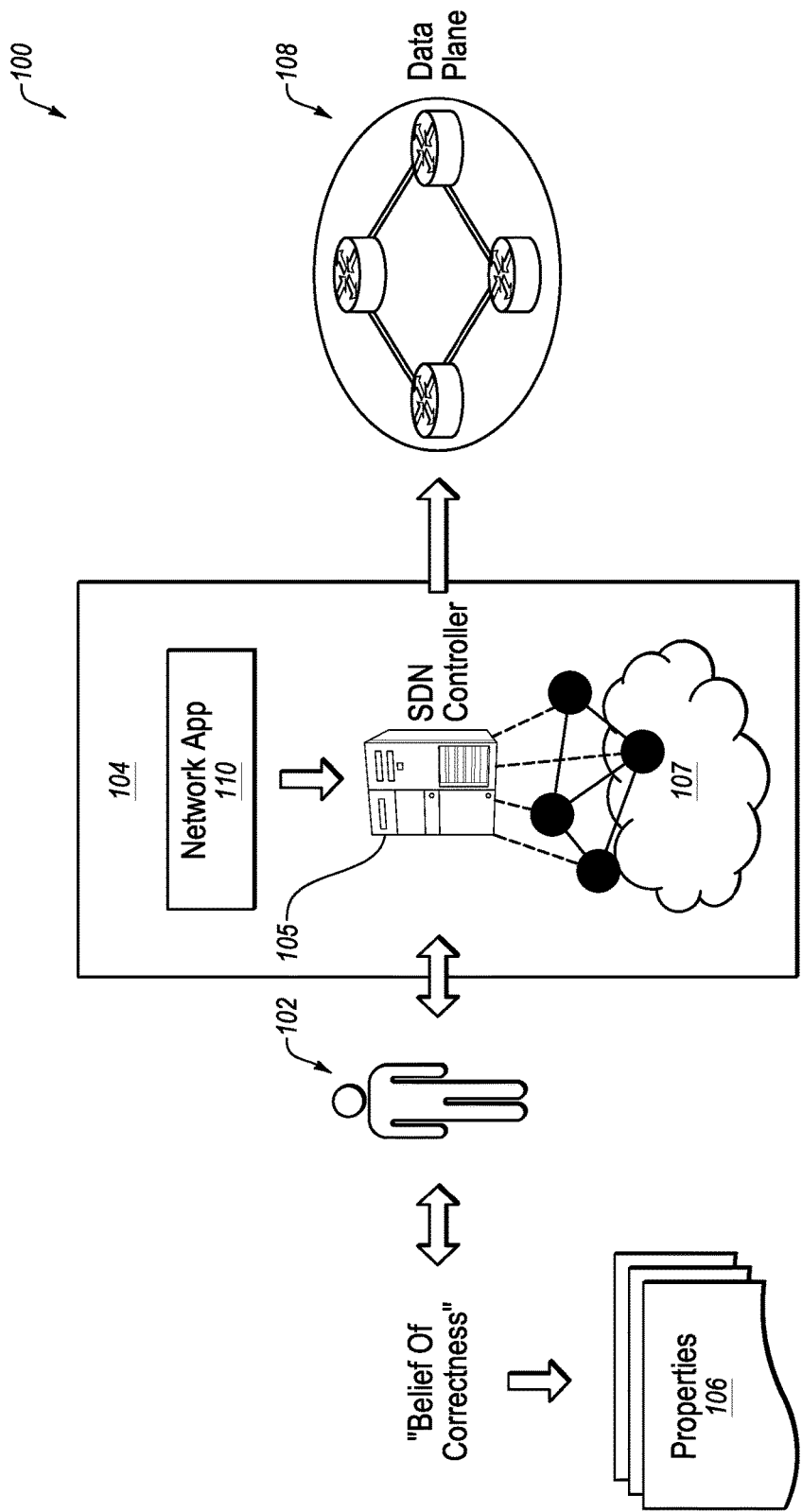
FIG. 1 illustrates an example system that may be used for network verification.

Real-time network verification may automatically detect violations of network-wide reachability invariants on a data plane. To be useful in practice, these violations may be detected in the order of milliseconds, without raising false alarms.

In an ever-increasing interconnected world, network traffic is increasingly diverse and demanding, ranging from communication between small everyday devices to larges-cale data centers. This diversity has driven the design and rapid adoption of new open networking architectures, built on programmable network switches, which make it possible to separate the control plane from the data plane. This separation opens up interesting avenues for innovation, including rigorous network analysis for detecting network-related bugs. Finding these bugs may automatically pose one or more challenges.

For example, since the control plane is typically a Turing-complete program, the problem of automatically proving the absence of bugs in the control plane is generally undecidable. However, the data plane, which is produced by the control plane, can be automatically analyzed. While the problem of checking reachability properties in the data plane is generally NP-hard, the problem becomes polynomial-time solvable in the restricted, but not uncommon, case where network switches only forward packets by matching Internet protocol (IP) prefixes. This theoretical fact underpins real-time network verification tools that can automatically detect violations of network-wide invariants on the data plane in the order of milliseconds, without raising false alarms.

Conventional systems may perform network verification incrementally, by only checking changes that occur between two data plane snapshots. Specifically, conventional systems exploit two observations, namely: (i) only small parts of the network tend to be affected by typical changes to the data plane; and (ii) there tends to be significant degree of commonality among all forwarding rules in the entire network. To this end, conventional methods include constructing and verifying, from scratch, a set of representations of the forwarding behavior, one for each functional change induced by the data plane change. This leads to inefficiencies in space and computation time for the validation.

Further, conventional systems and methods may verify data and control planes in isolation, and only one data plane is verified at a time. In addition, it is difficult to map detected bugs to specific artifacts in controller code, and control plane verification may miss subtle data plane bugs. Moreover, conventional systems and methods are only semi-automated and may require expertise to prove automated theorems.

Various embodiments of the present disclosure relate to verification of networks, and in particular, to verification of software-defined networks (SDN) or networks employing network function virtualization (NFV). Network verification may be performed in real-time (e.g., on a deployed network), or offline, during development and pre-deployment testing of a network. Network verification may include verifying the correctness of individual snapshots of a network data plane.

As noted above, relatively small parts of a network tend to be affected by typical changes to a data plane, and there tends to be significant degree of commonality among all forwarding rules in a network. In contrast to conventional systems and methods, various embodiments of the present disclosure may effectively exploit another observation, namely, commonality among flows of packets through parts of a network, rather than its entirety. According to one embodiment, a real-time data plane checker, which may be referred to herein as a "delta-net" may be configured to address all-pairs reachability queries.

Exploiting this observation, a single compact representation of the forwarding behavior of an entire network may be constructed, wherein the single compact representation may be incrementally and efficiently updated on each data plane change, and thus, changes may be verified more efficiently. Furthermore, in instances where the functional impact of a change may not be localized (e.g., in the case of link or node failures), the representation may also provide significant space efficiencies over conventional methods.

According to various embodiments, as described more fully below, real-time ("delta-net") network verification may include automatically refining a lattice-theoretical abstract domain to represent flows of all packets in a network as an edge-labelled graph. More specifically, instead of constructing multiple forwarding graphs for representing the flow of packets in a network, embodiments of the present disclosure may include transforming a single edge-labelled graph via incrementally maintaining the lattice-theoretical concept of atoms, which may represent Boolean combinations of forwarding rules in a network. According to one embodiment, the graph may represent all Boolean combinations of forwarding rules in a network.

Atom representation may be based on lattice theory and, therefore, may be considered as an abstract domain for analyzing Internet Protocol (IP) prefix forwarding rules. The precision of the abstract domain may be refined dynamically, thus limiting, and possibly preventing, false alarms. According to various embodiments, analysis of rule insertion or rule removal may be performed in, for example, approximately 40 microseconds on average, an improvement over conventional methods.

Data plane checkers may be deployed in production environments. Due to real-time constraints, this may understandably limit the kind of safety properties that can be checked. However, limitations may not exist in pre-deployment testing scenarios. Various embodiments of the present disclosure may facilitate the answering of a broader classes of reachability queries, such as all-pair reachability queries.

In addition, various embodiments may be backward compatible with known incremental network verification techniques that construct forwarding graphs for the purpose of checking primarily single-source reachability properties. This may preserve a functional characteristics that expertise in formal verification may not be required to check the data plane.

Embodiments of the present disclosure are now explained with reference to the accompanying drawings.

FIG. 1 illustrates system 100 that may be used in a network verification process. System 100 includes a network administrator 102, a software-defined network (SDN) 104, properties 106, and a data plane 108. SDN 104 may include an SDN controller 105, a physical network 107, which may include data plane 108, and a network application 110.

Properties 106 may include, for example, one or more network-wide invariants, which may be defined by network administrator 102 for reaching one or more goals. For example, the one or more network-wide invariants may include a one or more "reachability invariants." A "control plane" may include SDN controller 105 and network application 110. A "data plane" (e.g., data plane 108) may include a snapshot of a configuration of various network switches at a given time.

During operation of a network, an event (e.g., failure events (e.g., node, links), traffic events (e.g., feedback from devices to controller, additional/expiration of connection requests), etc.) may cause SDN controller 105 to modify data plane 108.

Figure 2:
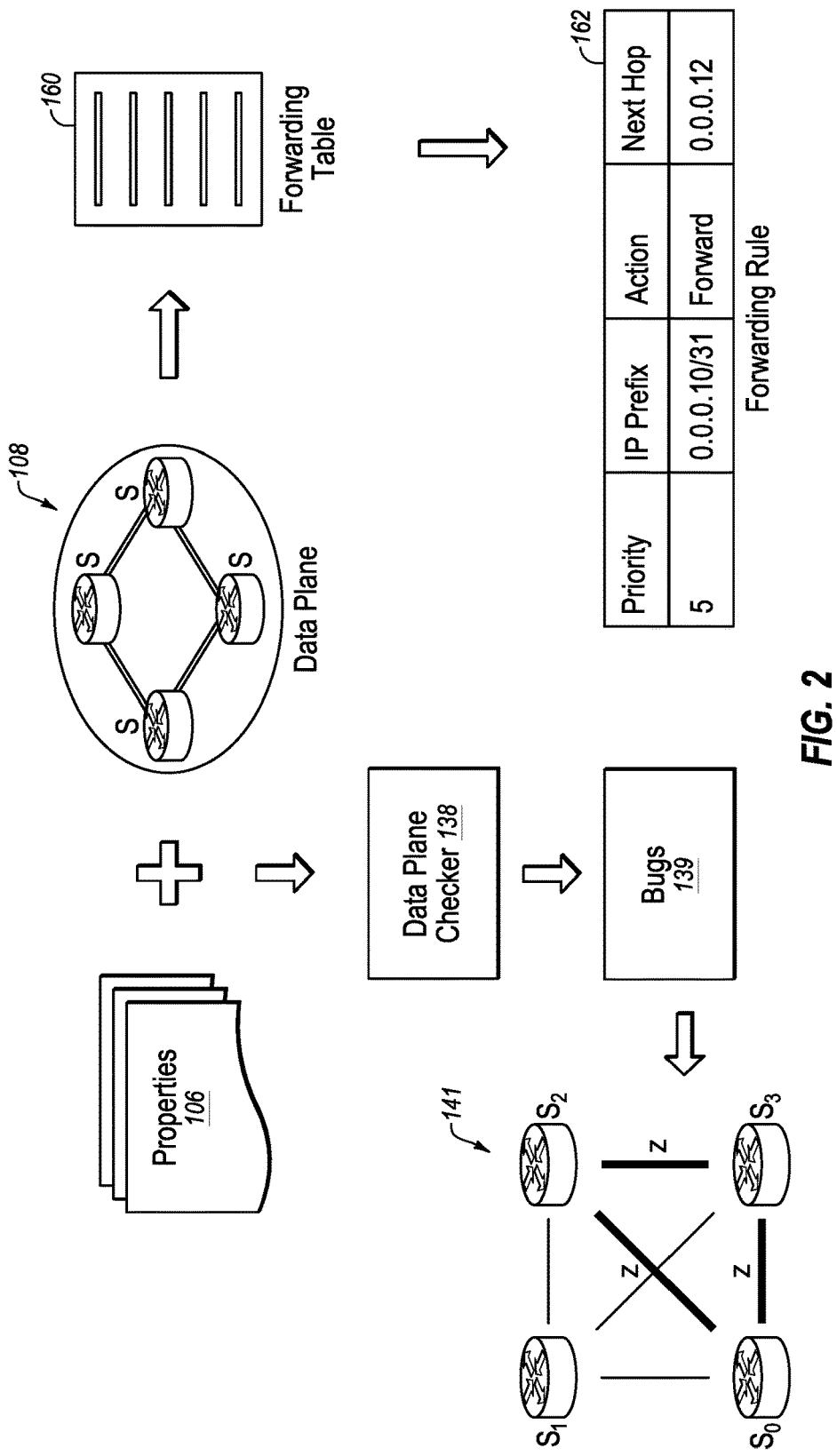
FIG. 2 depicts example components that may be used for network verification.

FIG. 2 depicts properties 106 and data plane 108. Each switch S in data plane 108 may include one or more forwarding tables 160, which may include one or more forwarding rules, such as example forward rule 162. FIG. 2 further depicts a data plane checker 138, which may be configured to detect one or more bugs 139. As an example, a bug may include an undesirable forwarding loop, as depicted by reference numeral 141.

Figure 3:
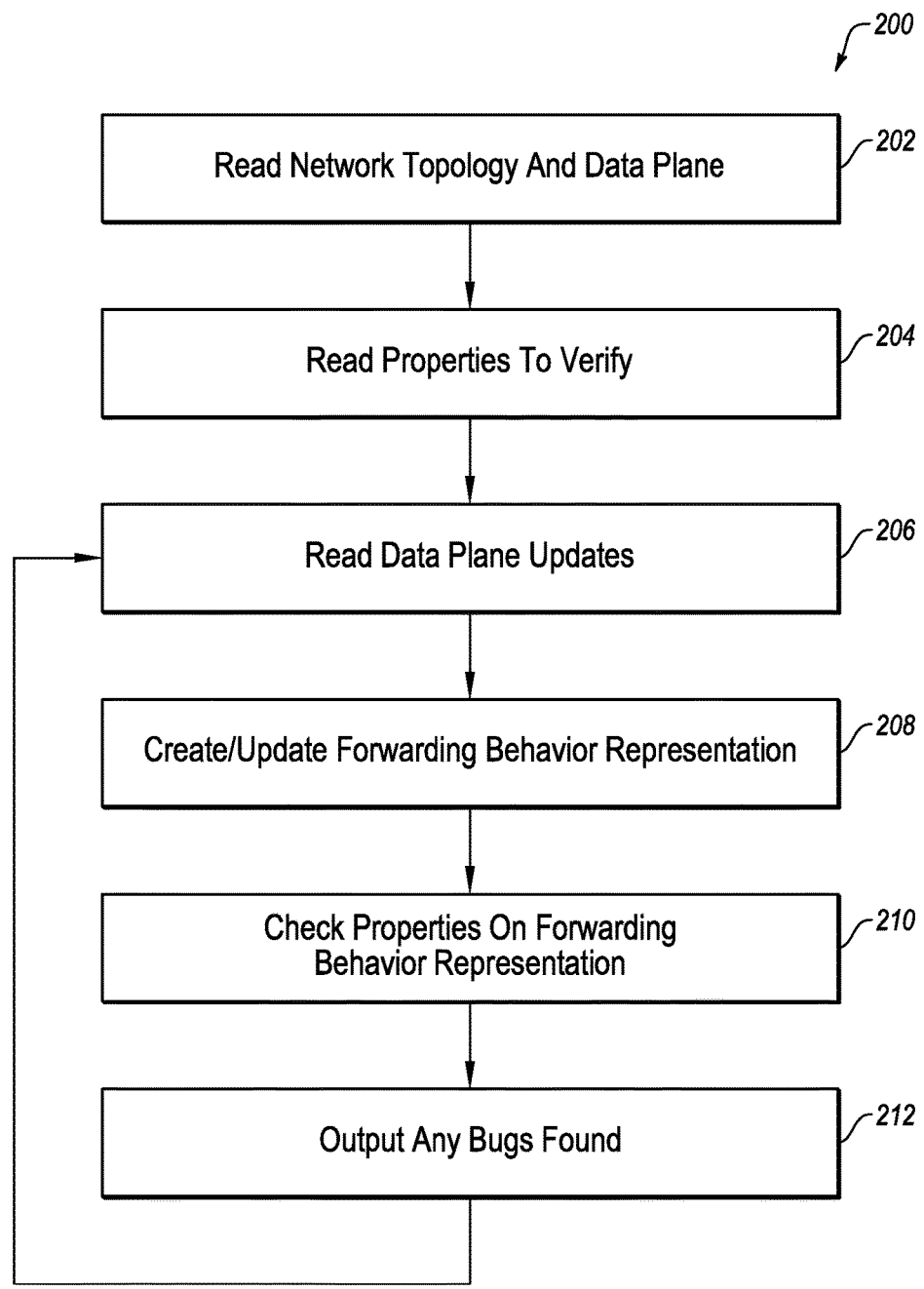
FIG. 3 is a flowchart of an example method for detecting errors in a network.

FIG. 3 is a flowchart of an example method 200 for detecting errors ("bugs") in a network, in accordance with at least one embodiment of the present disclosure. Method 200 may be performed by any suitable system, apparatus, or device. For example, system 900 of FIG. 14 or one or more of the components thereof may perform one or more of the operations associated with method 200. In these and other embodiments, program instructions stored on a computer readable medium may be executed to perform one or more of the operations of method 200. Further, each act of method 200 may be static or dynamic, and may be performed online (e.g., in real-time), or offline. Further, each act may be performed incrementally or non-incrementally.

At block 202, a network topology and a data plane may be read, and method 200 may proceed to block 204. For example, data plane 108 (see e.g., FIG. 2) and an associated network topology (e.g., including one or more forwarding tables for each switch in data plane 108) may be identified.

At block 204, properties may be read (e.g., for verification), and method 200 may proceed to block 206. For example, properties 106 (see e.g., FIG. 2) may be read to verify that data plane 108 satisfies properties 106.

At block 206, one or more data plane updates, if applicable, may be read, and method 200 may proceed to block 208. For example, data plane 108 (see e.g., FIG. 2), after each update, may be read.

At block 208, a forwarding behavior representation, determined from one or more forwarding tables, may be created and/or updated, and method 200 may proceed to block 210. It is noted that a "forwarding behavior representation" may comprise a logical (e.g., machine checkable) representation of a data plane. More specifically, a "forwarding behavior representation" may comprise an edge-labelled graph, as described more fully below.

At block 210, the forwarding behavior representation may be checked to verify satisfaction of properties (e.g., properties 106), and method 200 may proceed to block 212. At block 212, any known errors ("bugs") may be outputted, and method 200 may return to block 206.

Modifications, additions, or omissions may be made to method 200 without departing from the scope of the present disclosure. For example, the operations of method 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 4A:
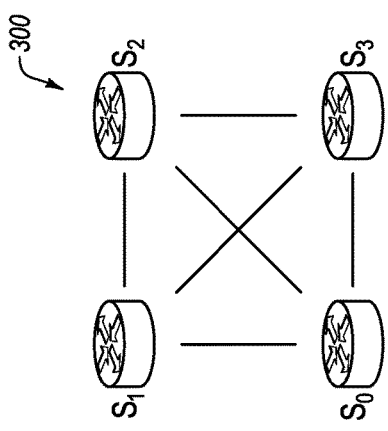
FIG. 4A depicts an example network topology.
Figure 4D:
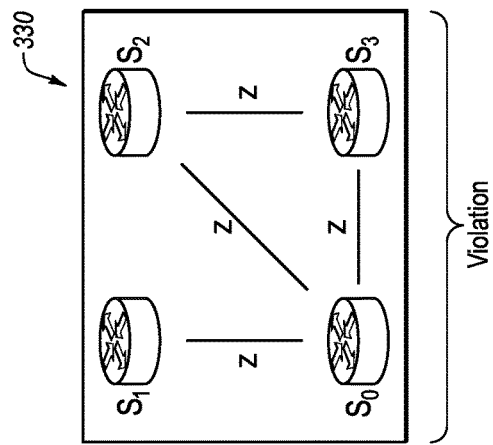
FIGS. 4B-4D depict example forwarding graphs associated with the network topology of FIG. 4A.
Figure 4C:
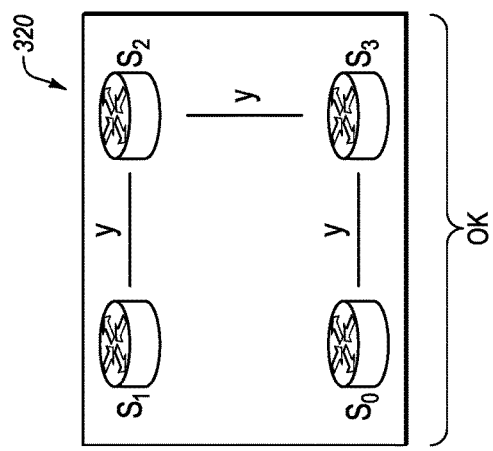
Figure 4B:
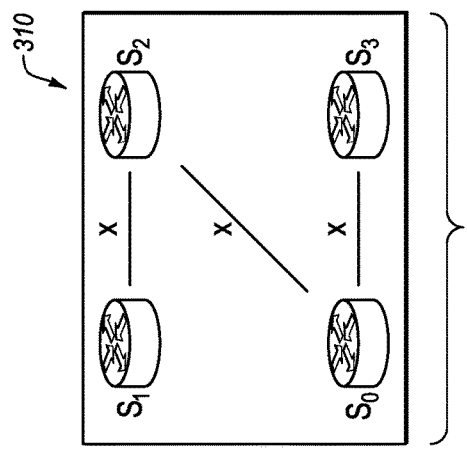

FIG. 4A depicts a network topology 300 including switches $S_0$-$S_3$. FIG. 4B depicts a forwarding graph 310 for network topology 300 including a flow for a network packet x, FIG. 4C depicts a forwarding graph 320 for network topology 300 including a flow for a network packet y, and FIG. 4D depicts a forwarding graph 330 for network topology 300 including a flow for a network packet z. Forwarding graphs 310 and 320 do not include a forwarding loop and do not violate a property. However, forwarding graph 330 includes a forwarding loop and, as a result, violates a property (e.g., of properties 106).

Figure 5:
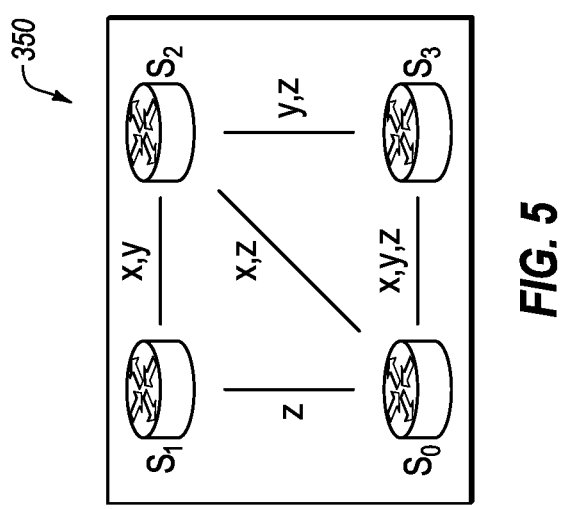
FIG. 5 illustrates an example edge-labeled graph.

Constructing forwarding graphs is expensive. According to various embodiments of the present disclosure, commonality among flows of packets through a network may be utilized to reduce the overhead of constructing graphs. For example, forwarding graphs may be more compactly represented by an edge-labelled graph. FIG. 5 depicts an example edge-labeled graph 350 depicting flows for network packets x, y, and z. Edge-labeled graph 350 may represent the forwarding graphs 310, 320, and 330, respectively illustrated in FIGS. 4B, 4C, and 4D.

Figure 6A:
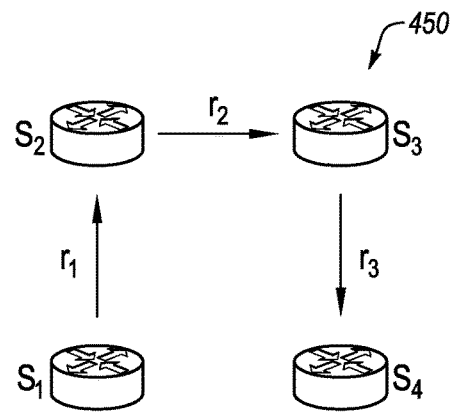
FIG. 6A illustrates an example forwarding graph.

FIG. 6A depicts an example forwarding graph 450 of a network including switches $s_1$-$s_4$ and rules $r_1$-$r_3$. A collection of IP prefixes in the network induces half-closed intervals, each of which may be referred to herein as an atom. As used herein, an "atom" or "atoms" may form a family of sets of network packets, such that Boolean combinations of rules in an entire network may be represented. A set of atoms may represent an IP prefix.

Figure 6B:
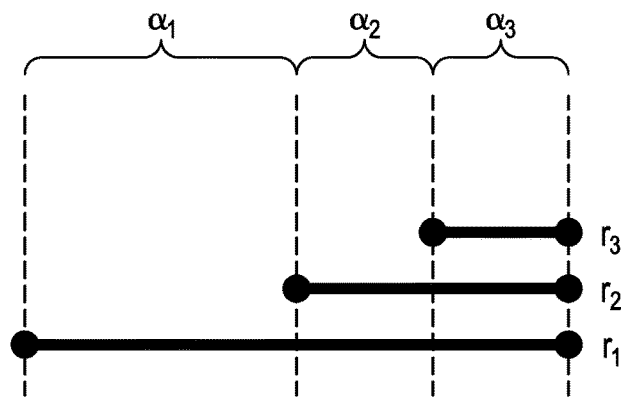
FIG. 6B depicts example intervals for various forwarding rules.
Figure 6C:
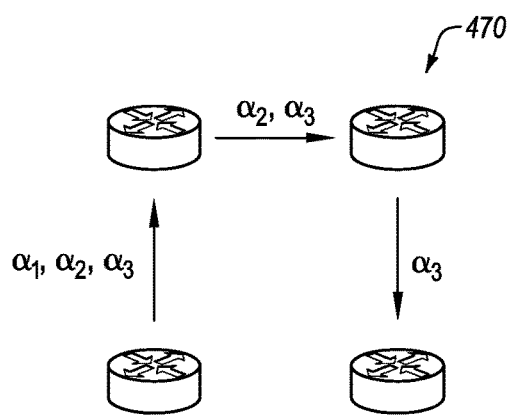
FIG. 6C illustrates an example edge-labelled graph.

FIG. 6B depicts intervals for rules $r_1$, $r_2$, and $r_3$. As shown in FIG. 6B, an interval for rule $r_1$ includes atoms $\alpha_1$, $\alpha_2$, $\alpha_3$, and $\alpha_4$, an interval for rule $r_2$ includes atoms $\alpha_2$ and $\alpha_3$, and an interval for rule $r_3$ includes atom $\alpha_3$. FIG. 6C depicts a single edge-labelled graph 470, wherein atoms $\alpha_1$, $\alpha_2$, $\alpha_3$ represent an interval for rule $r_1$, atoms $\alpha_2$ and $\alpha_3$ represent an interval for rule $r_2$, and atom $\alpha_3$ represents an interval for rule $r_3$.

Figure 7B:
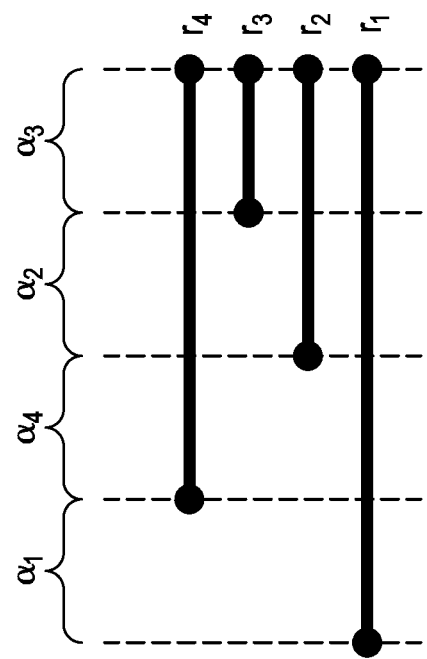
FIG. 7B depicts example intervals for various forwarding rules.
Figure 7A:
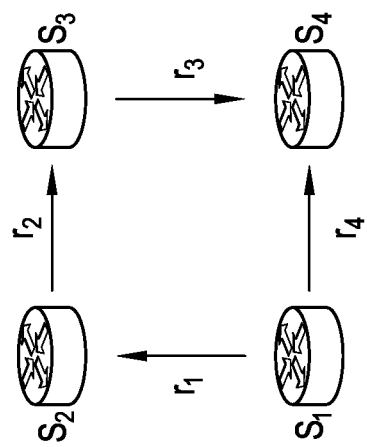
FIG. 7A depicts an example forwarding graph.

FIG. 7A depicts an example forwarding graph 500 including switches $s_1$-$s_4$ and rules $r_1$-$r_4$. In this example, rule $r_4$ is a new rule inserted into the network, and rule $r_4$ has priority over rule $r_1$. FIG. 7B depicts intervals for rules $r_1$, $r_2$, $r_3$, and $r_4$. As shown in FIG. 7B, an interval for rule $r_1$ includes atoms $\alpha_1$, $\alpha_2$, $\alpha_3$, and $\alpha_4$, an interval for rule $r_2$ includes atoms $\alpha_2$ and $\alpha_3$, an interval for rule $r_3$ includes atom $\alpha_3$, and an interval for rule $r_4$ includes atoms $\alpha_2$, $\alpha_3$, and $\alpha_4$.

Figure 7D:
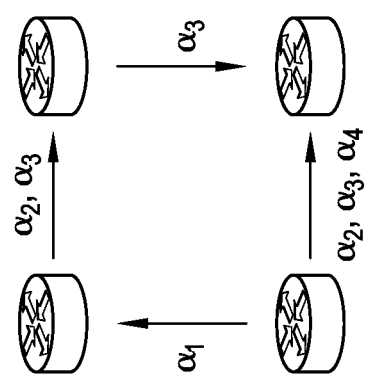
FIG. 7D depicts an example edge-labelled graph.
Figure 7C:
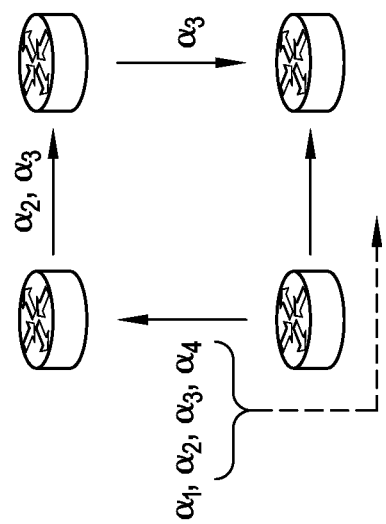
FIG. 7C illustrates an example edge-labelled graph.

FIG. 7C illustrates a single edge-labelled graph 520, wherein atoms $\alpha_1$, $\alpha_2$, $\alpha_3$ represent an interval for rule $r_1$, atoms $\alpha_2$ and $\alpha_3$ represent an interval for rule $r_2$, and atom $\alpha_3$ represents an interval for rule $r_3$. Further, according to various embodiments, edge-labelled graph 520 may be transformed in response to rule $r_4$ being added to the network. FIG. 7D depicts an edge-labelled graph 540, which is transformed from edge-labelled graph 520, and wherein atom $\alpha_1$ represents an interval for rule $r_1$, atoms $\alpha_2$ and $\alpha_3$ represent an interval for rule $r_2$, atom $\alpha3$ represents an interval for rule $r_3$, and atoms $\alpha_2$, $\alpha_3$, and $\alpha_4$ represent an interval for newly added rule $r_4$. It is noted that the graph transformation may avoid construction of multiple overlapping forwarding graphs by transforming a single edge-labelled graph.

Figure 8:
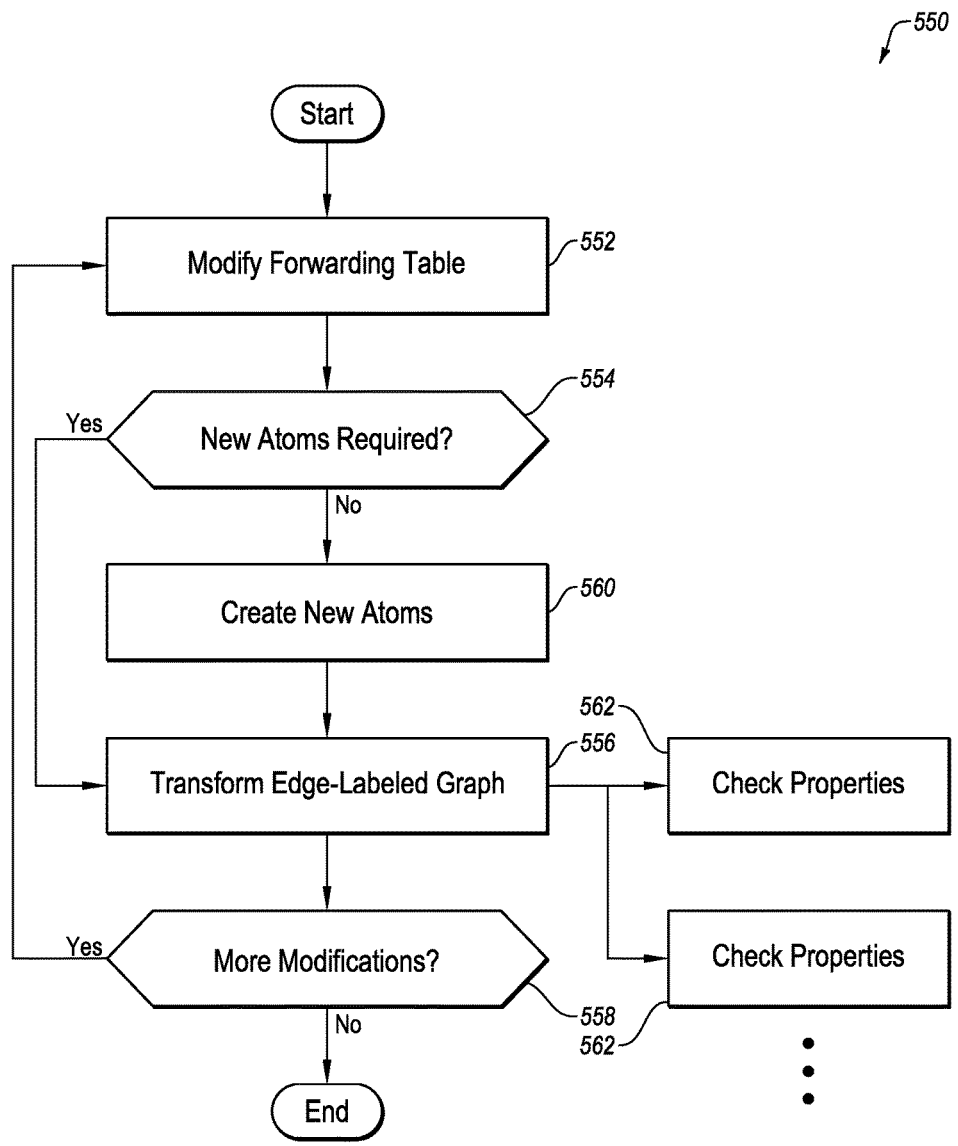
FIG. 8 is a flowchart of an example method for verifying a network.

FIG. 8 is a flowchart of an example method 550 for verifying a network, in accordance with at least one embodiment of the present disclosure. Method 550 may be performed by any suitable system, apparatus, or device. For example, system 900 of FIG. 14 or one or more of the components thereof may perform one or more of the operations associated with method 550. In these and other embodiments, program instructions stored on a computer readable medium may be executed to perform one or more of the operations of method 550.

At block 552, a forwarding table may be modified, and method 550 may proceed to block 554. For example, forwarding table 160 (see FIG. 2) may be modified via adding a rule to the forwarding table, removing a rule from the forwarding table, or both.

At block 554, it may be determined whether any additional atoms are required for representing the modified forwarding table. If it is determined that one or more additional atoms are required, method 550 may proceed to block 560. If it is determined that one or more additional atoms are not required, method 550 may proceed to block 556.

At block 556, an edge-labelled graph (e.g., a transformed edge-labelled graph) may be generated based on the forwarding table, and method 550 may proceed to block 558. For example, an edge-labelled graph 540 (see FIG. 7D) may be generated. Further, properties may be checked at blocks 562. For example, each edge-labelled graph may be compared to properties 106 (see FIG. 2) to detect one or more errors.

At block 558, it may be determined whether any modifications to the forwarding table are required (e.g., in response to adding a rule to the forwarding table, removing a rule from the forwarding table, or both). If it is determined that one or more modifications to the forwarding table are required, method 550 may return to block 552. If it is determined that one or more modifications are not required, method 550 may end.

At block 560, new atoms may be created, and method 550 may proceed to block 556. At block 562, one or more edge-labelled graphs may be compared to one or more properties to verify the network.

In contrast to conventional methods that may require that each network packet equivalence class, which induces a forwarding graph, be checked separately, embodiments of the present disclosure may include constructing a representation of the forwarding behavior of an entire network, wherein the representation may be incrementally and efficiently updated with each data plane change.

Modifications, additions, or omissions may be made to method 550 without departing from the scope of the present disclosure. For example, the operations of method 550 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

At least one conventional method includes re-computing equivalence classes each time a rule is inserted or removed. This generally requires traversal of rules in different forwarding tables. Thus, for example, when rule $r_4$ is inserted into switch $s_4$, the conventional method traverses all four rules. In contrast, embodiment of the present disclosure include a more persistent form of packet equivalence classes (e.g., atoms).

Incrementally maintaining atoms may include various advantages. First, since there tends to be fewer atoms than rules in a network, atoms may effectively compress information on how packets flow in the network. Second, atoms may allow a system to efficiently infer which rules are affected by the removal and/or insertion of a rule. More specifically, in the example described with reference to FIGS. 9A-9D, only rules $r_1$ and $r_4$ on switch $s_1$ need to be inspected to transform the edge-labelled graph, rather than all rules as in conventional systems, which construct multiple forwarding graphs.

Figure 9:
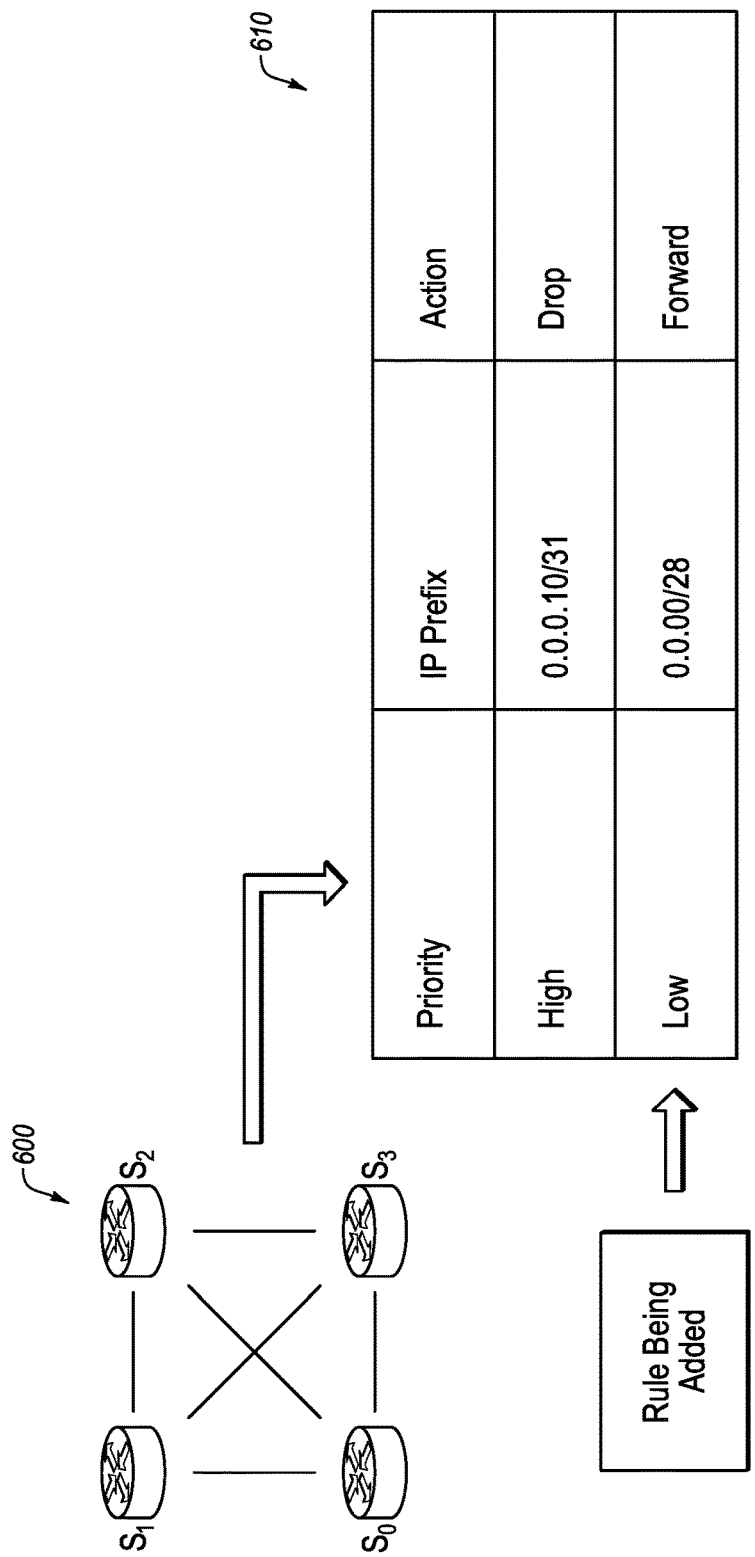
FIG. 9 illustrates a network topology and a forwarding table.

FIG. 9 depicts a network topology 600 and a forwarding table 610 for a network switch. Forwarding table 610 includes entries for two rules, rule $r_H$ having a high priority and rule $r_L$ having a low priority. Rule $r_H$ drops packets whose destination address matches the IP prefix "0.0.0.10/31" (using the IPv4 CIDR format), and rule, $r_L$ forwards packets destined to the IP prefix "0.0.0.0/28."

As noted above, IP prefixes may be considered as intervals, and more specifically half-closed intervals. An IP prefix of rule $r_H$ corresponds to a half-closed interval [10:12) because the IP prefix "0.0.0.10/31" is equivalent to the 32-bit sequence that starts with all zeros and ends with 101* where * denotes an arbitrary bit. Similarly, the IP prefix "0.0.0.0/28"=[0:16) since 0.0.0.0/28=0 . . . 0****.

Figure 10:
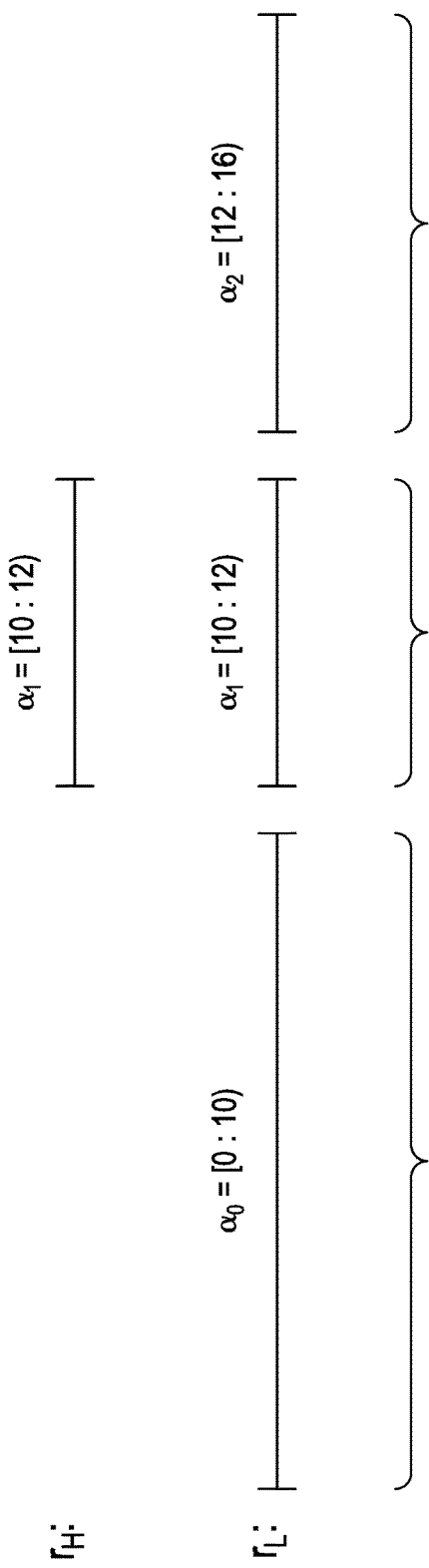
FIG. 10 depicts example atoms for various forwarding rules.
Figure 11:
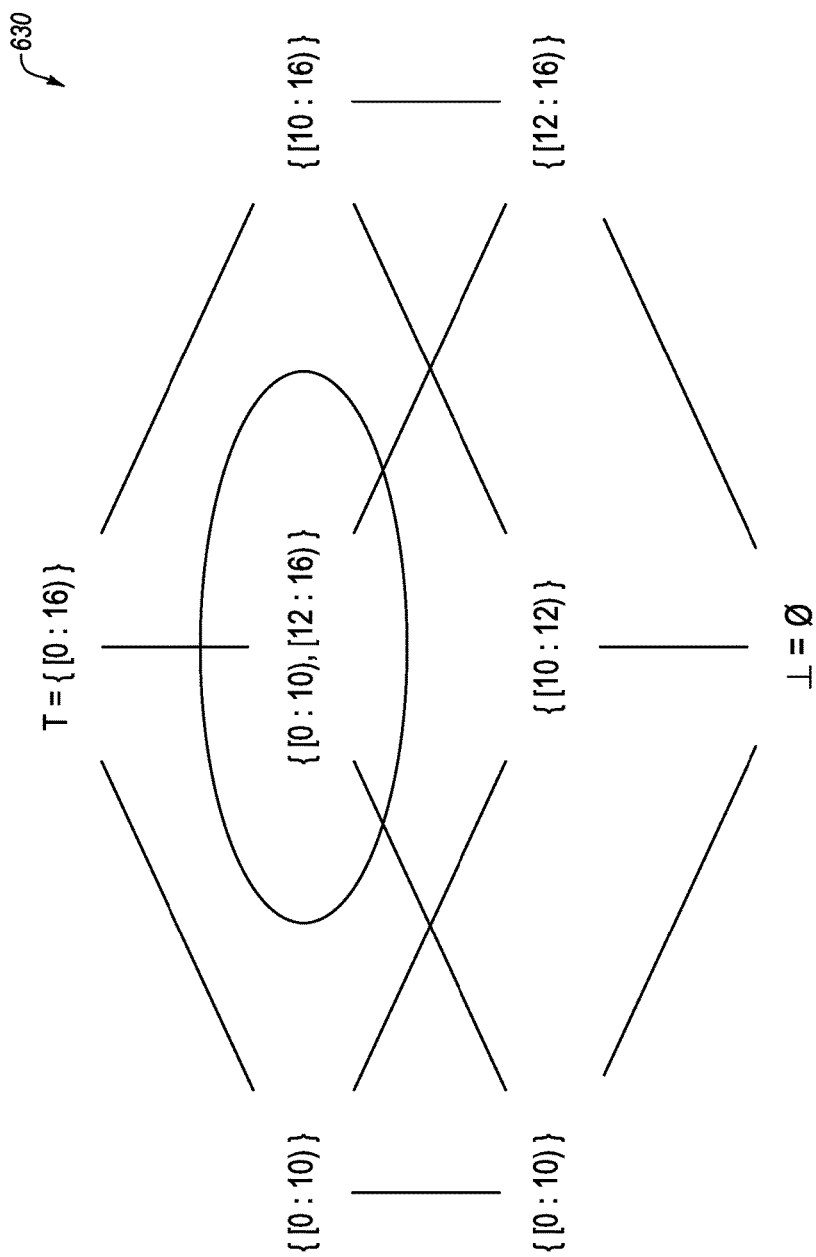
FIG. 11 illustrates an example Hasse diagram.

IP prefixes of all the rules in the network may be dissected into disjoint half-closed intervals. With reference to FIG. 10, and the rules $r_H$ and $r_L$ of table 610 of FIG. 9, each of the resulting half-closed intervals may be referred to as an "atom" because each atom induces a Boolean lattice, as illustrated by a Hasse diagram 630 in FIG. 11. In Hasse diagram 630, atoms [0:10), [10:12), and [12:16) correspond to $\alpha_0$, $\alpha_1$ and $\alpha_2$ in FIG. 10, respectively.

By construction of atoms, an IP prefix of a rule r may be represented as a set of atoms. An IP prefix representation may be denoted by interval(r). For example, an IP prefix for rule $r_H$ is interval($r_H$) and may correspond to a singleton set including atom $\alpha_1$, whereas an IP prefix for rule $r_L$ is interval($r_L$) and may correspond to atoms $\alpha_0$, $\alpha_1$, $\alpha_2$. Using these atoms, the set difference [interval($r_L$)−interval($r_H$)] may be used to formalize that the IP prefix of rule $r_L$, may only match packets that are not dropped by the higher-priority rule $r_H$.

Figure 12A:
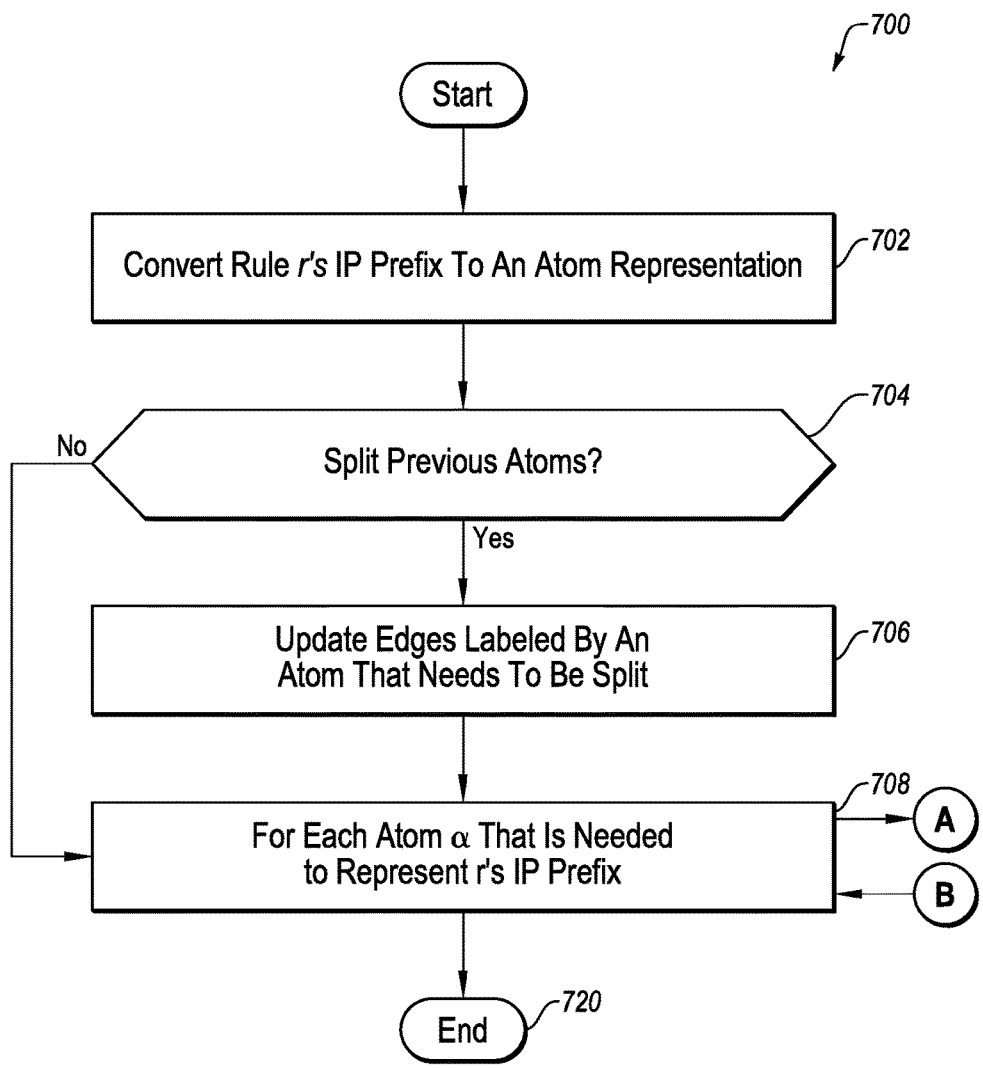
FIGS. 12A and 12B depict a flowchart of an example method for inserting a forwarding rule into a network.
Figure 12B:
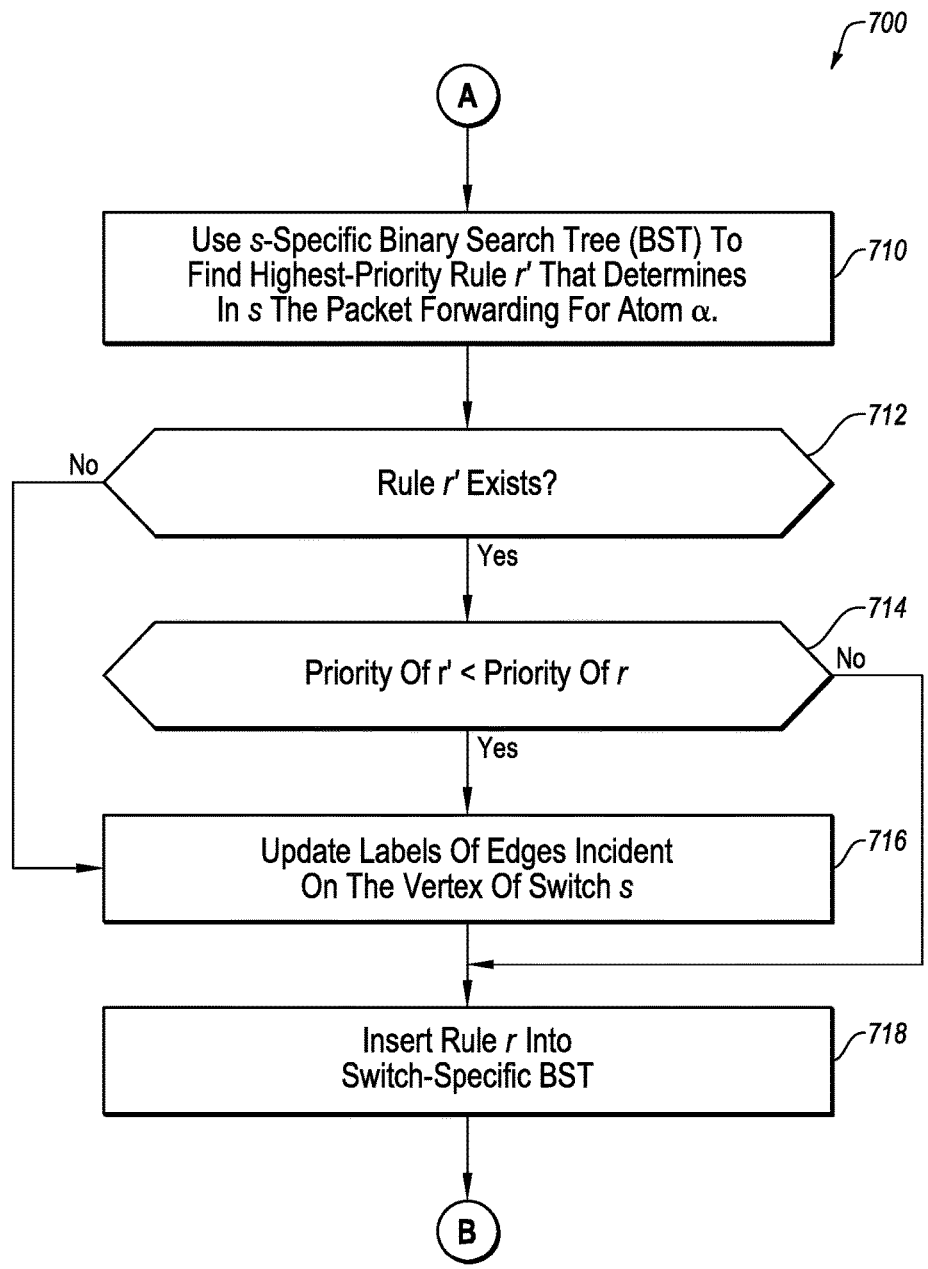

FIGS. 12A and 12 depict a flowchart of an example method 700 for inserting a rule r into a switch s of a network, in accordance with at least one embodiment of the present disclosure. Method 700 may be performed by any suitable system, apparatus, or device. For example, system 900 of FIG. 14 or one or more of the components thereof may perform one or more of the operations associated with method 700. In these and other embodiments, program instructions stored on a computer readable medium may be executed to perform one or more of the operations of method 700.

At block 702, an IP prefix of a rule r may be converted to an atom representation (e.g., as described above with reference to FIGS. 11 and 12), and method 700 may proceed to block 704.

At block 704, it may be determined whether previous atoms may be split. If it is determined that one or more previous atoms may be split, method 700 may proceed to block 706. If it is determined that one or more previous atoms may not be split, method 700 may proceed to block 708.

At block 706, each edge that is labelled by an atom to be split may be updated, and method 700 may proceed to block 708. For example, a half-closed interval previously represented by a single atom α may be represented by two atoms (e.g., atom α and atom α'). This may be referred to as "atom splitting," and may provide an efficient mechanism for incrementally refining the precision of the abstract domain. This incremental abstraction refinement may allow for precise and efficient representation of all Boolean combinations of rules in a network.

At block 708, for each atom α needed to represent an IP prefix of rule r, method 700 may proceed to block 710. If rule r is sufficiently represented by one or atoms, method 700 may end at block 720.

At block 710, a switch-specific balanced binary search tree (BST) may be used to determine the highest priority rule r' in switch s that determines packet forwarding from atom α, and method 700 may proceed to block 712.

At block 712, it may be determined whether another rule r' exists in switch s. If it is determined that rule r' exists, method 700 may proceed to block 714. If it is determined that rule r' does not exist, method 700 may proceed to block 716.

At block 714, it may be determined whether the priority of rule r' is lower than the priority of rule r. If it is determined that the priority of rule r' is not lower than the priority of rule r, method 700 may proceed to block 716. If it is determined that the priority of rule r' is less than the priority of r, method 700 may proceed to block 718.

At block 716, labels of each edge incident on switch s may be updated, and method 700 may proceed to block 718.

At block 718, rule r may be inserted into switch-specific BST (e.g., in case rule r' is removed), and method 700 may return to block 708.

It is noted that rules in the BST may be pruned due to, for example, two IP prefixes being disjointed, or one IP prefix being included in the other. Thus, the highest-priority rule that determines the forwarding behavior of a packet for all atoms that are in the interval of the rule that is to be inserted or removed may be determined via linearly traversing all rules in a switch that are included in the IP prefix of that rule.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 13A:
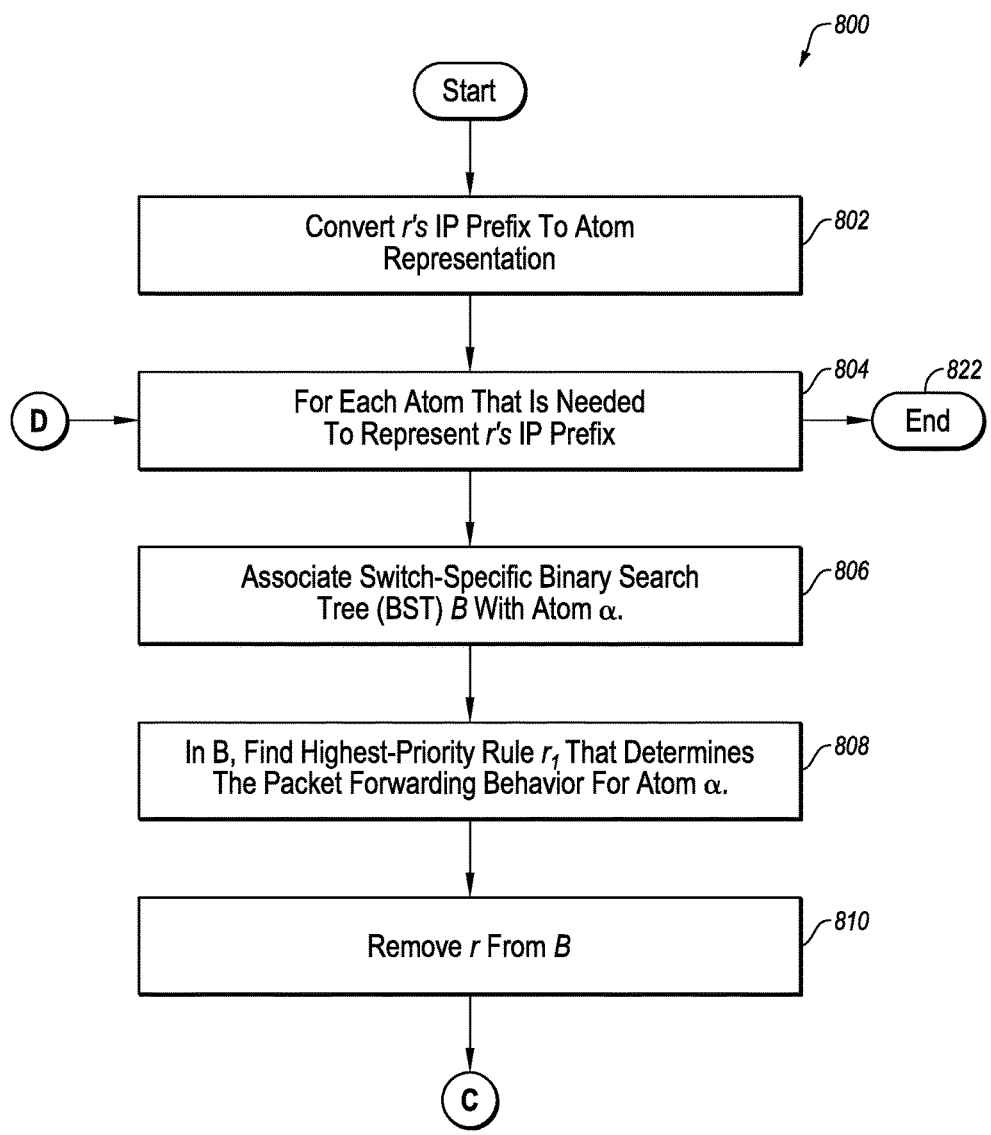
FIGS. 13A and 13B depict a flowchart of an example method for removing a forwarding rule from a network.
Figure 13B:
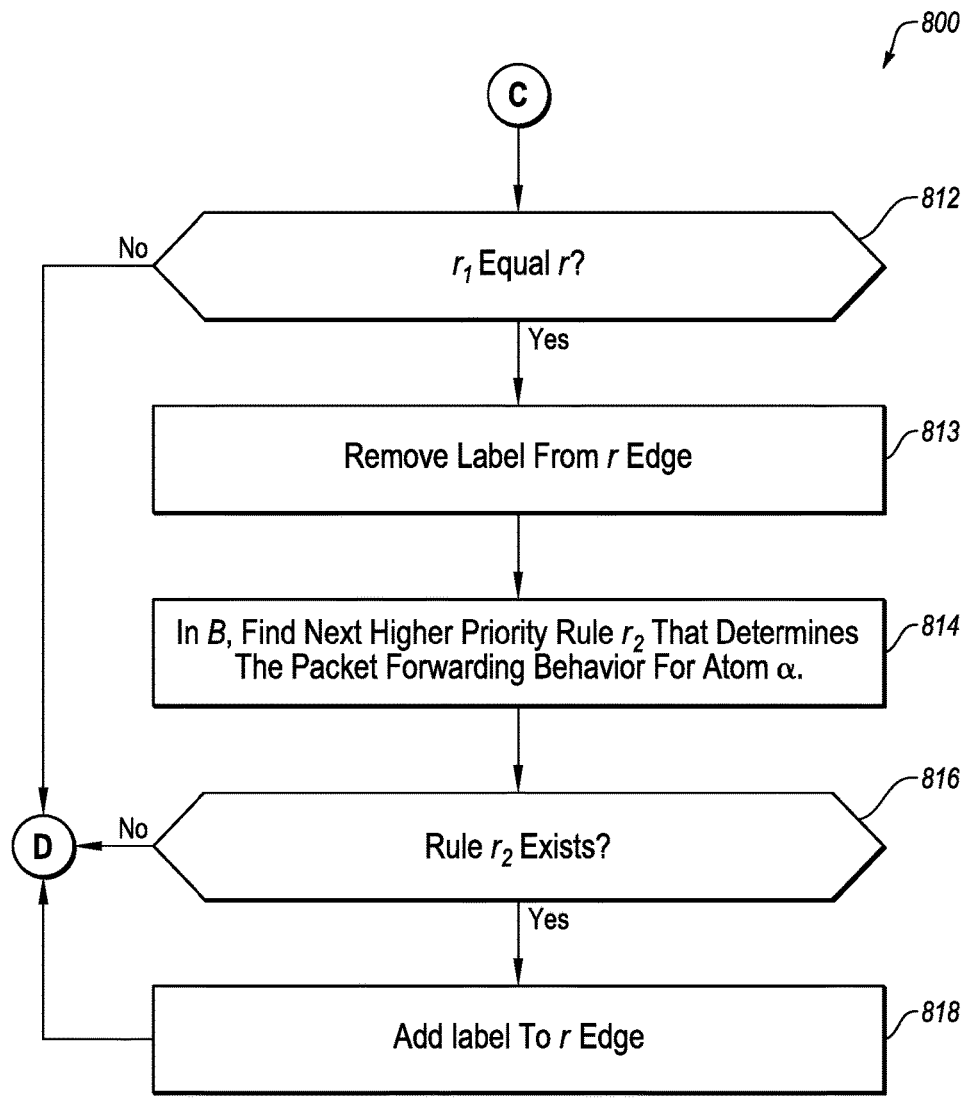

FIGS. 13A and 13B depict a flowchart of an example method 800 for removing a rule from a switch in a network, in accordance with at least one embodiment of the present disclosure. Method 800 may be performed by any suitable system, apparatus, or device. For example, system 900 of FIG. 14 or one or more of the components thereof may perform one or more of the operations associated with method 800. In these and other embodiments, program instructions stored on a computer readable medium may be executed to perform one or more of the operations of method 800.

At block 802, an IP prefix of a rule r may be converted to an atom representation (e.g., as described above with reference to FIGS. 11 and 12), and method 800 may proceed to block 804.

At block 804, for each atom α needed to represent rule r's IP prefix, method 800 may proceed to block 806. If rule r is sufficiently represented by one or atoms, method 800 may end at block 822.

At block 806, a switch-specific BST B may be associated with atom α, and method 800 may proceed to block 808.

At block 808, in BST B, the highest priority rule $r_1$ in switch s that determines packet forwarding behavior from atom α may be identified, and method 800 may proceed to block 810.

At block 810, rule r may be removed from BST B, and method 800 may proceed to block 812.

At block 812, it may be determined whether the rule $r_1$ in switch s is the same rule as rule r in switch s. If it is determined that rule $r_1$ is the same rule as rule r, method 800 may proceed to block 813. If it is determined that rule $r_1$ is not is the same rule as rule r, method 800 may return to block 804.

At block 813, an atom label may be removed from rule r edge, and method 800 may proceed to block 814.

At block 814, in B, the next highest priority rule $r_2$ in switch s that determines the packet forwarding behavior from atom α may be identified, and method 800 may proceed to block 816.

At block 816, it may be determined if rule $r_2$ exists in switch s. If it is determined that rule $r_2$ exists, method 800 may proceed to block 818. If it is determined that rule $r_2$ does not exist, method 800 may return to block 804.

At block 818, an atom label may be added to an edge of rule $r_2$, and method 800 may return to block 804.

It is noted that rules in the BST may be pruned due to, for example, two IP prefixes being disjointed, or one IP prefix is included in the other. Thus, the highest-priority rule that determines the forwarding behavior of a packet for all atoms that are in the interval of the rule that is to be inserted or removed may be determined via linearly traversing all rules in a switch that are included in the IP prefix of that rule.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 14:
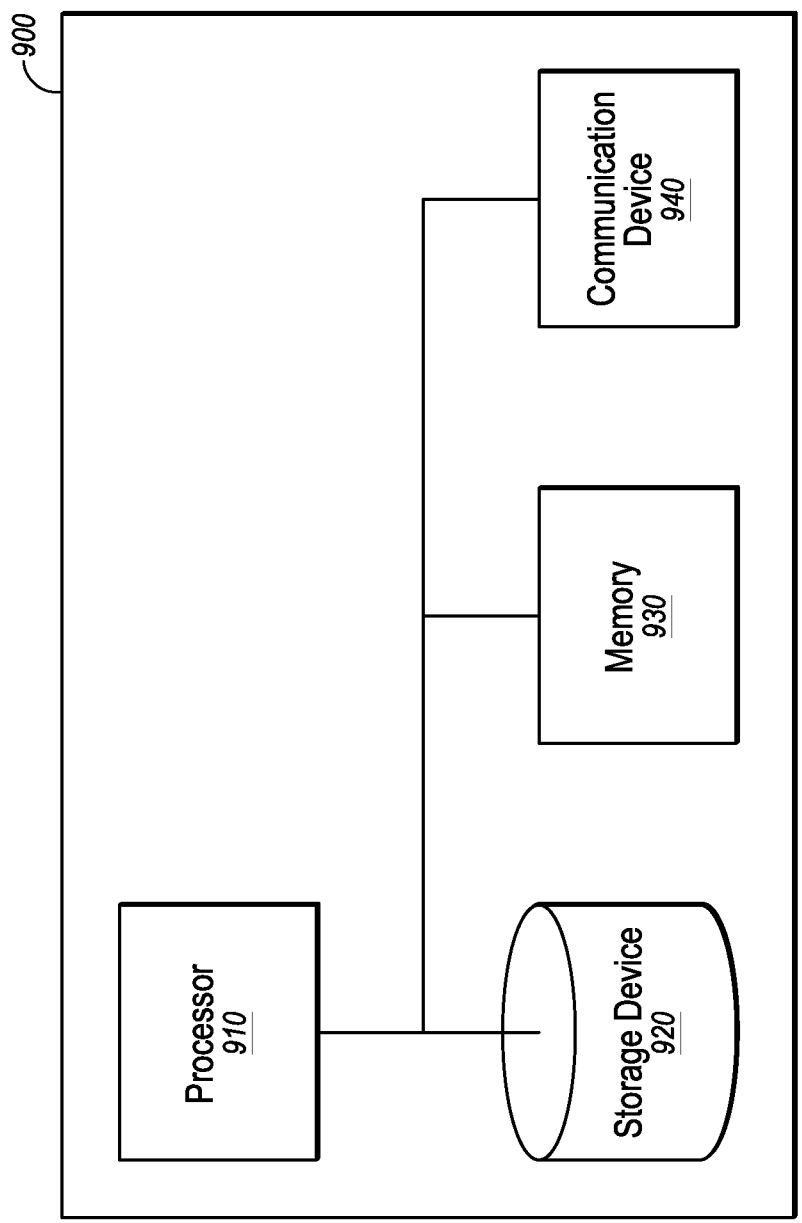
FIG. 14 is a block diagram of an example computing system.

FIG. 14 is a block diagram of an example computing system 900, in accordance with at least one embodiment of the present disclosure. Computing system 900 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 900 may include a processor 910, a storage device 920, a memory 930, and a communication device 940. Processor 910, storage device 920, memory 930, and/or communication device 940 may all be communicatively coupled such that each of the components may communicate with the other components. Computing system 900 may perform any of the operations described in the present disclosure.

In general, processor 910 may include any suitable special-purpose or general-purpose computer, computing entity, or processing device including various computer hardware or software modules and may be configured to execute instructions stored on any applicable computer-readable storage media. For example, processor 910 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 14, processor 910 may include any number of processors configured to perform, individually or collectively, any number of operations described in the present disclosure.

In some embodiments, processor 910 may interpret and/or execute program instructions and/or process data stored in storage device 920, memory 930, or storage device 920 and memory 930. In some embodiments, processor 910 may fetch program instructions from storage device 920 and load the program instructions in memory 930. After the program instructions are loaded into memory 930, processor 910 may execute the program instructions.

For example, in some embodiments, one or more of the processing operations for network verification may be included in data storage 920 as program instructions. Processor 910 may fetch the program instructions of one or more of the processing operations and may load the program instructions of the processing operations in memory 930. After the program instructions of the processing operations are loaded into memory 930, processor 910 may execute the program instructions such that computing system 900 may implement the operations associated with the processing operations as directed by the program instructions.

Storage device 920 and memory 930 may include computer-readable storage media for carrying or having computer-executable instructions or data structures stored thereon. Such computer-readable storage media may include any available media that may be accessed by a general-purpose or special-purpose computer, such as processor 910. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 910 to perform a certain operation or group of operations.

In some embodiments, storage device 920 and/or memory 930 may store data associated with network verification. For example, storage device 920 and/or memory 930 may store properties, data planes, network applications, forwarding tables, forwarding rules, forwarding behavior representations, and graphs (e.g., edge-labelled graphs and/or transformed edge-labelled graphs).

Communication device 940 may include any device, system, component, or collection of components configured to allow or facilitate communication between computing system 900 and another electronic device. For example, communication device 940 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 940 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 14 without departing from the scope of the present disclosure. For example, computing device 900 may include more or fewer elements than those illustrated and described in the present disclosure. For example, computing system 900 may include an integrated display device such as a screen of a tablet or mobile phone or may include an external monitor, a projector, a television, or other suitable display device that may be separate from and communicatively coupled to computing system 900.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A network verification method, comprising:
    identifying a data plane including one or more forwarding tables for each switch of a plurality of switches in the data plane;
    generating a forwarding behavior representation of the data plane including a plurality of atoms to represent Boolean combinations of forwarding rules of the one or more forwarding tables of the data plane, an interval for each rule of the forwarding rules represented by a unique set of at least one atom of the plurality of atoms; and
    comparing the forwarding behavior representation of the data plane to one or more network properties to detect one or more errors in the data plane.

2. The method of claim 1, wherein the generating the forwarding behavior representation comprises generating a logical representation of the data plane.

3. The method of claim 1, further comprising:
    identifying an updated data plane in response to a forwarding rule being added to a forwarding table of a switch of the plurality of switches;
    generating another forwarding behavior representation of the updated data plane; and
    comparing the another forwarding behavior representation of the updated data plane to the one or more network properties to detect one or more errors in the updated data plane.

4. The method of claim 1, wherein the generating the forwarding behavior representation of the data plane comprises generating an edge-labelled graph, wherein each edge of the edge-labelled graph is associated with one or more atoms to represent an Internet Protocol (IP) prefix of a forwarding rule of the data plane.

5. The method of claim 4, further comprising updating the edge-labelled graph to generate an updated edge-labelled graph in response to a forwarding rule being removed from a forwarding table of the one or more forwarding tables.

6. The method of claim 4, further comprising updating the edge-labelled graph to generate an updated edge-labelled graph in response to a forwarding rule being added to a forwarding table of the one or more forwarding tables.

7. The method of claim 6, further comprising incrementally updating the updated edge-labelled graph in response to one or more modifications of the one or more forwarding tables.

8. The method of claim 1, wherein the comparing the forwarding behavior representation to one or more network properties comprises comparing the forwarding behavior representation to one or more network reachability properties.

9. One or more non-transitory computer-readable media that include instructions that, when executed by one or more processors, are configured to cause the one or more processors to perform operations, the operations comprising:
identifying a data plane including one or more forwarding tables for each switch of a plurality of switches in the data plane;
generating a forwarding behavior representation of the data plane including a plurality of atoms to represent Boolean combinations of forwarding rules of the one or more forwarding tables in the data plane, an interval for each rule of the forwarding rules represented by a unique set of at least one atom of the plurality of atoms; and
comparing the forwarding behavior representation of the data plane to one or more network properties to detect one or more errors in the data plane.

10. The computer-readable media of claim 9, the operations further comprising:
identifying an updated data plane in response to a forwarding rule being added to a forwarding table of a switch of the plurality of switches;
generating another forwarding behavior representation of the updated data plane; and
comparing the another forwarding behavior representation of the updated data plane to the one or more network properties to detect one or more errors in the updated data plane.

11. The computer-readable media of claim 9, wherein the generating the forwarding behavior representation of the data plane comprises generating an edge-labelled graph, wherein each edge of the edge-labelled graph is associated with one or more atoms to represent an Internet Protocol (IP) prefix of a forwarding rule of the data plane.

12. The computer-readable media of claim 11, the operations further comprising updating the edge-labelled graph to generate updated edge-labelled graph in response to a forwarding rule being added to a forwarding table of the one or more forwarding tables.

13. The computer-readable media of claim 12, the operations further comprising incrementally updating the updated edge-labelled graph in response to one or more modifications of the one or more forwarding tables.

14. The computer-readable media of claim 9, the operations further comprising updating the forwarding behavior representation in response to a forwarding rule being added to a forwarding table of a switch of the plurality of switches.

15. A network verification system, comprising:
one or more processors configured to:
identify a data plane including one or more forwarding tables for each switch of a plurality of switches in the data plane;
generate a forwarding behavior representation of the data plane including a plurality of atoms to represent Boolean combinations of forwarding rules of the one or more forwarding tables of the data plane, an interval for each rule of the forwarding rules represented by a unique set of at least one atom of the plurality of atoms; and
compare the forwarding behavior representation of the data plane to one or more network properties to detect one or more errors in the data plane.

16. The system of claim 15, wherein the one or more processors are further configured to:
identify an updated data plane in response to a forwarding rule being added to a forwarding table of a switch of the plurality of switches;
generate another forwarding behavior representation of the updated data plane; and
compare the another forwarding behavior representation of the updated data plane to the one or more network properties to detect one or more errors in the updated data plane.

17. The system of claim 15, wherein the forwarding behavior representation of the data plane comprises an edge-labelled graph, wherein each edge of the edge-labelled graph is associated with one or more atoms to represent an Internet Protocol (IP) prefix of a forwarding rule of the data plane.

18. The system of claim 17, wherein the one or more processors are further configured to update the edge-labelled graph to generate an updated edge-labelled graph in response to one or more modifications of the one or more forwarding tables.

19. The system of claim 18, wherein the one or more modifications comprise adding one or more forwarding rules to at least one forwarding table of the one or more forwarding tables.

* * * * *